(12) United States Patent
Santoso et al.

(10) Patent No.: US 11,886,471 B2
(45) Date of Patent: *Jan. 30, 2024

(54) SYNTHETIC INTELLIGENT EXTRACTION OF RELEVANT SOLUTIONS FOR LIFECYCLE MANAGEMENT OF COMPLEX SYSTEMS

(71) Applicant: THE BOEING COMPANY, Chicago, IL (US)

(72) Inventors: Robert B. Santoso, Anaheim, CA (US); Jay J. Patel, Irvine, CA (US); Keith P. Cai, Ontario, CA (US)

(73) Assignee: The Boeing Company, Arlington, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/306,739

(22) Filed: May 3, 2021

(65) Prior Publication Data
US 2021/0256043 A1   Aug. 19, 2021

Related U.S. Application Data

(63) Continuation of application No. 15/926,262, filed on Mar. 20, 2018, now Pat. No. 10,997,225.

(51) Int. Cl.
*G06F 16/00* (2019.01)
*G06F 16/31* (2019.01)
(Continued)

(52) U.S. Cl.
CPC .......... *G06F 16/313* (2019.01); *G06F 16/335* (2019.01); *G06F 16/3334* (2019.01);
(Continued)

(58) Field of Classification Search
CPC ......... G06N 20/00; G06N 30/40; G06Q 50/30
See application file for complete search history.

(56) References Cited

U.S. PATENT DOCUMENTS 5,907,841 A   5/1999   Sumita et al.
6,675,159 B1 *  1/2004   Lin .................. G06F 40/205
(Continued)

FOREIGN PATENT DOCUMENTS

EP    3543867    *  9/2019
EP    3543867 A1 *  9/2019

OTHER PUBLICATIONS

Extended European Search Report for Application No. 19163645.5-1217 dated Aug. 8, 2019.
(Continued)

*Primary Examiner* — Daniel A Kuddus
(74) *Attorney, Agent, or Firm* — Patterson + Sheridan, LLP

(57) ABSTRACT

Techniques for identifying relevant, natural language documents within a data repository. An electronic document specifying natural language text describing an issue with a complex system is received. One or more portions are removed from the electronic document. The portions are determined to satisfy predefined filtering rules. A first set of terms are determined using a data dictionary structure, and a second set of terms are determined, where at least one term in the second set of terms satisfies at least one predefined pattern matching rule. A third set of terms are determined by processing the electronic document as an input to a machine learning model trained to recognize relevant terms within the electronic document. A synthesized electronic document is generated from the first, second and third sets of terms, and the synthesized electronic document is used to identify a set of relevant documents within the data repository.

20 Claims, 11 Drawing Sheets

(51) Int. Cl.
    *G06F 16/38* (2019.01)
    *G06N 20/00* (2019.01)
    *G06F 16/335* (2019.01)
    *G06Q 50/30* (2012.01)
    *G06F 16/33* (2019.01)

(52) U.S. Cl.
    CPC ............. *G06F 16/38* (2019.01); *G06N 20/00* (2019.01); *G06Q 50/30* (2013.01)

(56) References Cited

U.S. PATENT DOCUMENTS

| | | | |
|---|---|---|---|
| 6,778,979 B2 | 8/2004 | Grefenstette et al. | |
| 7,194,483 B1 | 3/2007 | Mohan et al. | |
| 7,492,235 B2* | 2/2009 | Vice | H01P 1/22 333/81 A |
| 7,493,325 B1* | 2/2009 | Bhatnagar | G06F 16/30 707/999.102 |
| 8,380,489 B1 | 2/2013 | Zhang | |
| 9,037,580 B2* | 5/2015 | Brown | G06F 16/3329 706/14 |
| 9,256,649 B2 | 2/2016 | Patton et al. | |
| 9,449,080 B1 | 9/2016 | Zhang | |
| 9,606,990 B2* | 3/2017 | Allen | G06F 40/169 |
| 9,852,213 B2* | 12/2017 | Brown | G06F 16/3344 |
| 9,940,323 B2* | 4/2018 | Boyer | G06N 20/00 |
| 10,474,700 B2 | 11/2019 | Sennhauser et al. | |
| 2003/0069877 A1* | 4/2003 | Grefenstette | G06F 16/38 |
| 2003/0154071 A1 | 8/2003 | Shreve | |
| 2004/0068497 A1* | 4/2004 | Rishel | G06F 16/3338 707/999.005 |
| 2007/0094594 A1 | 4/2007 | Matichuk et al. | |
| 2010/0145720 A1 | 6/2010 | Reiner | |
| 2010/0145961 A1 | 6/2010 | Hu et al. | |
| 2011/0035211 A1 | 2/2011 | Eden | |
| 2011/0202334 A1 | 8/2011 | Abir | |
| 2012/0197862 A1 | 8/2012 | Woytowitz et al. | |
| 2013/0035961 A1 | 2/2013 | Yegnanarayanan | |
| 2013/0061200 A1 | 3/2013 | Roberts et al. | |
| 2014/0058722 A1 | 2/2014 | Sun et al. | |
| 2014/0108924 A1 | 4/2014 | Bhatt et al. | |
| 2014/0136972 A1* | 5/2014 | Rodgers | G06F 3/125 715/274 |
| 2014/0278361 A1 | 9/2014 | Pak et al. | |
| 2014/0280087 A1 | 9/2014 | Isensee et al. | |
| 2015/0193413 A1 | 7/2015 | Meschkat | |
| 2016/0092436 A1 | 3/2016 | Obayashi et al. | |
| 2016/0373423 A1 | 12/2016 | Naibo | |
| 2017/0011026 A1* | 1/2017 | Byron | G06N 7/005 |
| 2017/0039176 A1 | 2/2017 | Broderick et al. | |
| 2017/0039188 A1* | 2/2017 | Allen | G06F 40/169 |
| 2017/0193092 A1 | 7/2017 | Byron et al. | |
| 2017/0262528 A1 | 9/2017 | Potok et al. | |
| 2017/0364507 A1* | 12/2017 | Byron | G06N 5/022 |
| 2018/0081861 A1 | 3/2018 | Danielyan | |
| 2018/0225373 A1* | 8/2018 | Alba | G06F 7/08 |
| 2018/0225374 A1* | 8/2018 | Alba | G06F 7/08 |
| 2018/0246876 A1 | 8/2018 | Allen et al. | |
| 2019/0130028 A1 | 5/2019 | Rajpathak et al. | |
| 2019/0205322 A1 | 7/2019 | Dobrynin et al. | |
| 2019/0205384 A1 | 7/2019 | Zhu et al. | |
| 2019/0294726 A1 | 9/2019 | Santoso et al. | |
| 2019/0303496 A1 | 10/2019 | Weinstein et al. | |

OTHER PUBLICATIONS

Patrice Lopez et al: "PATATRAS: Retrieval Model Combination and Regression Models for Prior Art Search", Sep. 30, 2009 (Sep. 30, 2009), Multilingual Information Access Evaluation I. Text Retrieval Experiments, Springer Berlin Heidelberg, Berlin, Heidelberg, pp. 430-437.

European Patent Office Examination Report for Applictaion No. 19 163 645.5-1213 dated Mar. 17, 2021.

European Patent Office, Summons to attend oral proceedings pursuant to Rule 115(1) EPC for Application 19 163 645.5-1203 dated May 24, 2022.

* cited by examiner

FIG. 4A
400

SUBJECT: LEFT CAR DOOR TRIM P/N XXXX1234 REFINISHING

~~The~~ manual indicates ~~that~~ we must replace ~~the~~ door trim P/N XXXX1234 ~~on the~~ LH driver's door during our repair ~~of the~~ vehicle. ~~(shown in view /A/ and /B/)~~. ~~The~~ online parts catalog (Ref /C/) suggests ~~to~~ request ~~the~~ P/N XXXX2345 ~~as a~~ replacement part instead of P/N XXXX1234. ~~However,~~ P/N XXXX2345 is not in stock ~~and the~~ recorded lead time for P/N XXXX2345 is 338 calendar days. ~~Our~~ customer ~~will~~ require ~~his~~ vehicle well in advance ~~of that~~ date, ....

We propose ~~to~~ manufacture ~~a~~ temporary replacement part until P/N XXXX2345 is available. Ref /D/ and /E/ indicate ~~that~~ P/N XXXX2345 ~~needs a~~ finish treatment ~~that we~~ do not have ~~the~~ resources ~~to~~ provide. ~~We~~ request ~~for your~~ allowance ~~to~~ perform ~~an~~ alternate plating process ~~as~~ defined by Ref /F/, ~~as an~~ alternative finish treatment. Please evaluate ~~our~~ proposal.

<u>Synonym and Stem Words Applied:</u>

LH →  Left Hand
Finishing → Finish
Replacement → Replace

SUBJECT: LEFT CAR DOOR TRIM P/N XXXX1234 REFINISHING

The manual indicates that we must replace the door trim P/N XXXX1234 on the LH driver's door during our repair of the vehicle. (shown in view /A/ and /B). The online parts catalog (Ref /C/) suggests to request the P/N XXXX2345 as a replacement part instead of P/N XXXX1234. However, P/N XXXX2345 is not in stock and the recorded lead time for P/N XXXX2345 is 338 calendar days. Our customer will require his vehicle well in advance of that date, ....

We propose to manufacture a temporary replacement part until P/N XXXX2345 is available. Ref /D/ and /E/ indicate that P/N XXXX2345 needs a finish treatment that we do not have the resources to provide. We request for your allowance to perform an alternate plating process as defined by Ref /F/, as an alternative finish treatment. Please evaluate our proposal.

SUBJECT: LEFT CAR DOOR TRIM P/N XXXX1234 REFINISHING

The manual indicates that we must replace the door trim P/N XXXX1234 on the LH driver's door during our repair of the vehicle. (shown in view /A/ and /B/). The online parts catalog (Ref /C/) suggests to request the P/N XXXX2345 as a replacement part instead of P/N XXXX1234. However, P/N XXXX2345 is not in stock and the recorded lead time for P/N XXXX2345 is 338 calendar days. Our customer will require his vehicle well in advance of that date, ....

We propose to manufacture a temporary replacement part until P/N XXXX2345 is available. Ref /D/ and /E/ indicate that P/N XXXX2345 needs a finish treatment that we do not have the resources to provide. We request for your allowance to perform an alternate plating process as defined by Ref /F/, as an alternative finish treatment. Please evaluate our proposal.

SUBJECT: LEFT CAR DOOR TRIM P/N XXXX1234 REFINISHING

The manual indicates that we must replace the door trim P/N XXXX1234 on the LH driver's door during our repair of the vehicle. (shown in view /A/ and /B/). The online parts catalog (Ref /C/) suggests to request the P/N XXXX2345 as a replacement part instead of P/N XXXX1234. However, P/N XXXX2345 is not in stock and the recorded lead time for P/N XXXX2345 is 338 calendar days. Our customer will require his vehicle well in advance of that date, ....

We propose to manufacture a temporary replacement part until P/N XXXX2345 is available. Ref /D/ and /E/ indicate that P/N XXXX2345 needs a finish treatment that we do not have the resources to provide. We request for your allowance to perform an alternate plating process as defined by Ref /F/, as an alternative finish treatment. Please evaluate our proposal.

| BMN | SR# | SERIES/PRODUCTS | PART # | SUBJECT |
|---|---|---|---|---|
| ABC-XYZ-12-1234 | 1-1234567 | ABC-20 | | Hood surface finish |
| ABC-XYZ-12-2345 | 1-2345678 | XYZ-801 | | PASSENGER DOOR FINISH |
| ABC-XYZ-12-3456 | 1-3456789 | ABC-20 | | FABRICATION WITH ALTERNATE FINISHING OF XYZ123 BRACKET |
| ABC-XYZ-12-4567 | 1-4567890 | ABC-50 | | Finishing requirements for replacement part |
| ABC-XYZ-12-5678 | 1-5678901 | XYZ-801 | | ABC-12345: FABRICATION WITH ALTERNATE FINISHING OF XYZ321 BOLT |
| ABC-XYZ-12-6789 | 1-6789012 | XYZ-801 | | REPAIRING DAMAGE TO LEATHER SEAT |
| ABC-XYZ-12-7890 | 1-7890123 | ABC-50 | XXXX1234 | Finish Substitution for Classic Car |
| ABC-XYZ-12-8901 | 1-8901234 | ABC-20 | | FABRICATION AND ALTERNATE FINISHING OF ABC7890 PLATE |
| ABC-XYZ-12-9012 | 1-9012345 | ABC-50 | | Lower Doorframe Finish Color |
| ABC-XYZ-12-0123 | 1-0123456 | XYZ-801 | XXXX1234 | Interior Material Substitution |

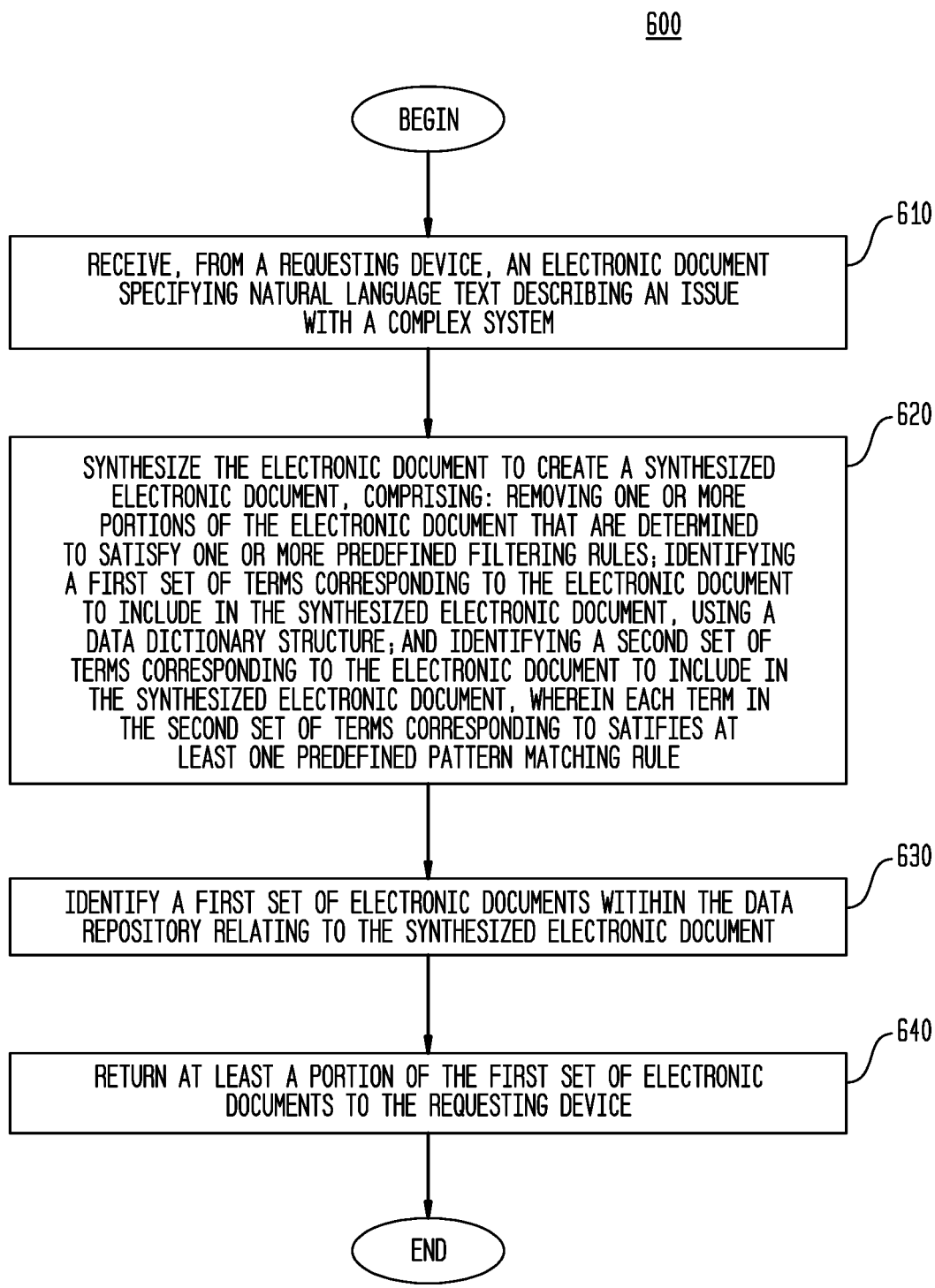

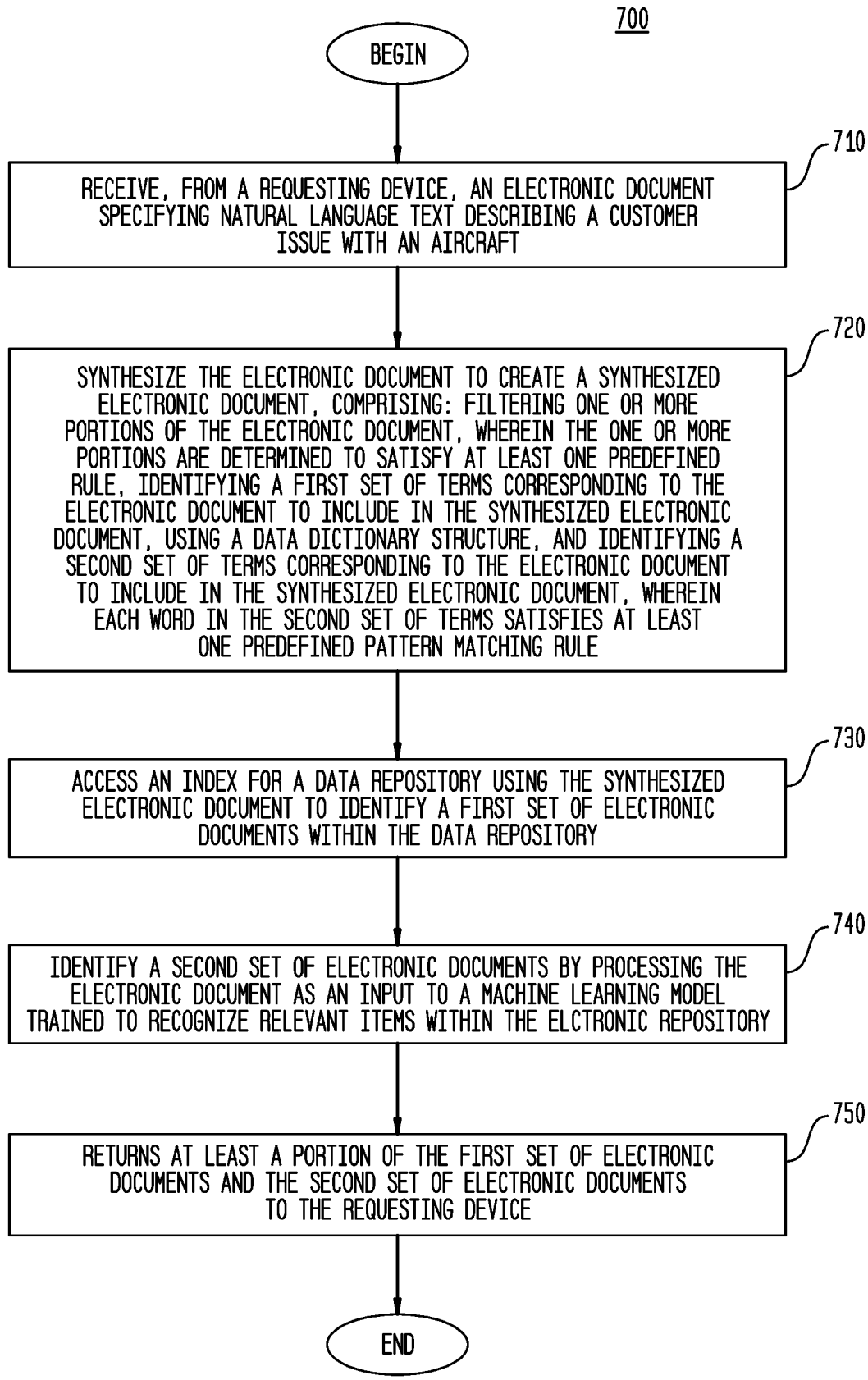

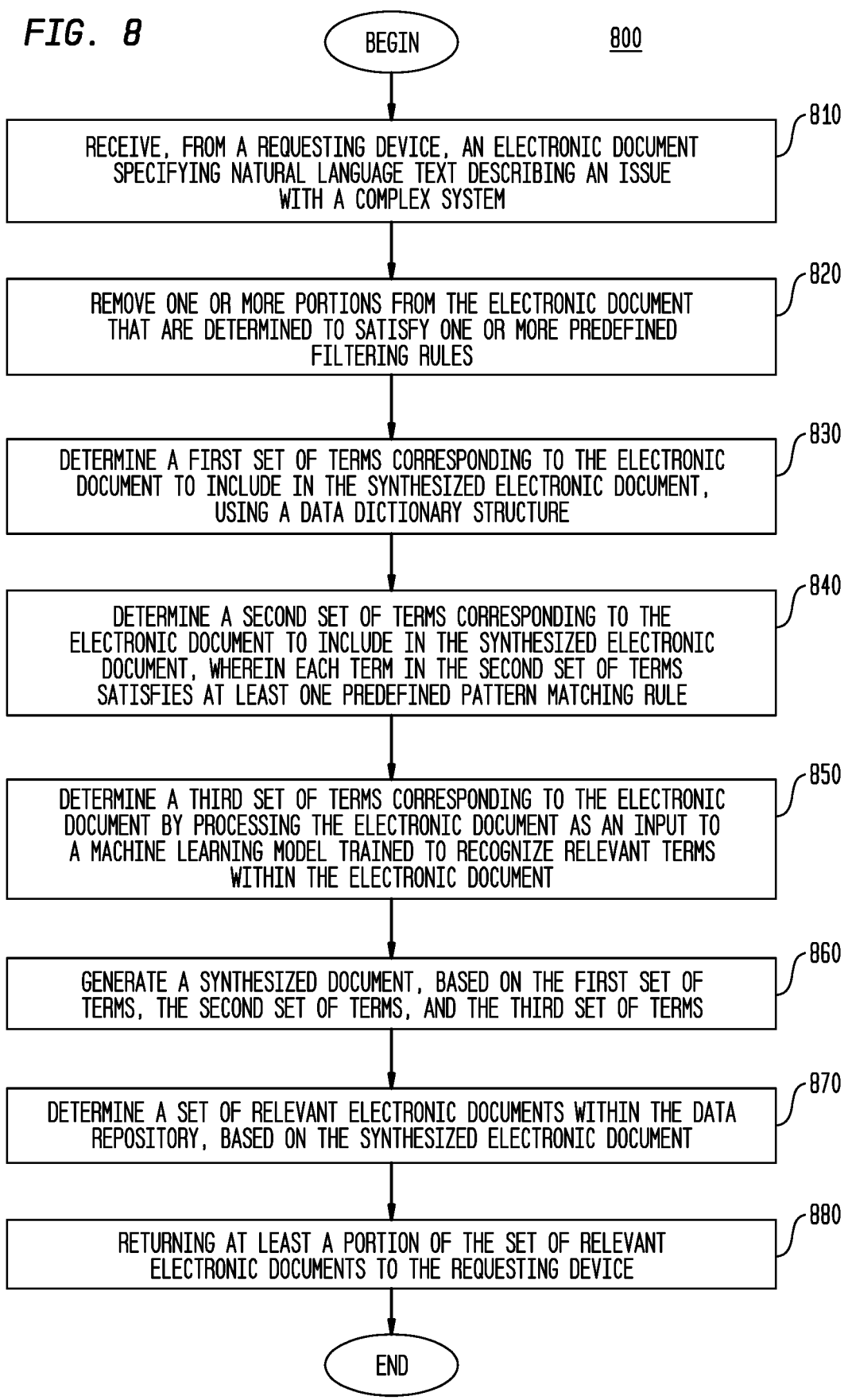

SYNTHETIC INTELLIGENT EXTRACTION OF RELEVANT SOLUTIONS FOR LIFECYCLE MANAGEMENT OF COMPLEX SYSTEMS

CROSS-REFERENCE TO RELATED APPLICATIONS

The present disclosure is a continuation of co-pending U.S. patent application Ser. No. 15/926,262 filed on Mar. 20, 2018 which is incorporated herein by reference in its entirety.

FIELD

The present disclosure related to electronic document retrieval, and more specifically, to techniques for determining a set of historical natural language documents that are relevant to a received natural language document describing an issue with a complex system.

BACKGROUND

Complex machinery, such as commercial aircraft, occasionally experience equipment faults. Some commercial aircraft and other complex machinery can transmit fault data to one or more computer systems, such as computer systems used by maintenance centers and computer systems operated by the aircraft manufacturer. In many instances, issues with a complex system are documented in natural language data, e.g., written by an engineer that is working to address the issue. Generally, information can be gathered on complex system faults and their corresponding solutions through data mining. Data mining broadly seeks to expose patterns and trends in data, and most data mining techniques are sophisticated methods for analyzing relationships among highly formatted data, such as numerical data or data with a relatively small fixed number of possible values. However, a vast amount of information consists of textually-expressed information, including many database fields, reports, memos, e-mail, web sites, and external news articles of interest to managers, market analysts, and researchers. As the amount of textually-expressed information continues to grow at a rapid rate, the technical fault of identifying a set of relevant information for a given natural language report of an issue with a complex system becomes increasingly difficult.

Text mining is an extension of the general notion of data mining in the area of free or semi-structured text. In comparison to data mining, text data analysis (also referred to as "text mining," or simply "text analysis") refers to the analysis of text, and may involve such functions as text summarization, information visualization, document classification, document clustering, document summarization, and document cross-referencing. Thus, text data analysis may help a knowledge worker find relationships between individual unstructured or semi-structured text documents and semantic patterns across large collections of such documents.

SUMMARY

According to one embodiment of the present invention, a method includes receiving, from a requesting device, an electronic document specifying natural language text describing an issue with a complex system. The method also includes synthesizing the electronic document to create a synthesized electronic document, by removing one or more portions of the electronic document that are determined to satisfy one or more predefined filtering rules, identifying a first set of terms corresponding to the electronic document to include in the synthesized electronic document, using a data dictionary structure, and identifying a second set of terms corresponding to the electronic document to include in the synthesized electronic document, wherein at least one term in the second set of terms corresponding to the electronic document satisfies at least one predefined pattern matching rule. The method includes identifying a first set of electronic documents within the data repository relating to the synthesized electronic document. Additionally, the method includes returning at least a portion of the first set of electronic documents to the requesting device.

In one aspect, in combination with any example above, the method further includes assigning a weight to at least one term in the first set of terms, the weight indicating the relevancy of the term relative to the other terms in the first set of terms, where identifying the first set of electronic documents within the data repository is based at least in part on the weights assigned to the terms in the first set of terms.

In one aspect, in combination with any example above, the complex system further comprises an aircraft, and the method further includes identifying metadata specifying an area of interest in the aircraft that the electronic document relates to, where the assigned weights are determined based at least in part on the area of interest.

In one aspect, in combination with any example above, identifying the first set of electronic documents within the data repository relating to the synthesized electronic documents further includes accessing an index for a data repository using the synthesized electronic document to identify the first set of electronic documents, where the index is generated based on a plurality of synthesized electronic documents corresponding to a plurality of electronic documents stored within the data repository.

In one aspect, in combination with any example above, synthesizing the electronic document to create the synthesized electronic document further includes adding one or more synonym words to the electronic document that correspond to a first word within the electronic document and replacing a first word within the electronic document with a corresponding stem word.

In one aspect, in combination with any example above, the method further includes identifying a second set of electronic documents within the data repository by processing the electronic document as an input to a machine learning model trained to recognize relevant electronic documents within the electronic repository, and returning at least a portion of the second set of search results to the requesting device.

In one aspect, in combination with any example above, the complex system further comprises an aircraft, where at least one word in the second set of terms is assigned a respective weight based on the corresponding at least one predefined pattern matching rule, where the weight is further determined based on a section of the aircraft that the electronic document relates to, and where at least one section of the aircraft is assigned respective weights for the at least one predefined pattern matching rules.

In one aspect, in combination with any example above, synthesizing the electronic document to create the synthesized electronic document, further includes identifying a third set of terms corresponding to the electronic document to include in the synthesized electronic document, by processing the electronic document as an input to a machine learning model trained to recognize relevant terms within the electronic document.

In one aspect, in combination with any example above, the method further includes refining the machine learning model trained to recognize relevant electronic documents within the data repository, storing the electronic document and an associated optimum solution within the data repository, and updating an index for the data repository to identify the stored electronic document and the associated optimum solution, based on the synthesized electronic document.

In one aspect, in combination with any example above, returning at least the portion of the first set of electronic documents to the requesting device further includes determining a relevancy metric for at least one electronic document in the first set of electronic documents, indicating a measure of relevancy of the respective electronic document from the first set of electronic documents to the received electronic document, determining one or more solutions to the issue with the complex system described by the natural language text of the received electronic document, based on solutions corresponding to the electronic documents in the first set of electronic documents and the determined relevancy metrics for the at least one document in the first set of electronic documents, and returning the one or more solutions to the issue with the complex system to the requesting device.

In one aspect, in combination with any example above, the complex system further comprises an aircraft, and wherein the data repository includes at least a first electronic document that comprises a repair request for an aircraft system, an update to an aircraft system, a replacement of an aircraft system, or a combination thereof, and wherein the requesting device further comprises an operator device for a fleet of aircrafts, inclusive of the aircraft.

Another embodiment described herein provides a system that includes one or more computer processors, and a memory containing computer program code that, when executed by operation of the one or more computer processors, performs an operation. The operation includes receiving, from a requesting device, an electronic document specifying natural language text describing a customer issue with an aircraft. The operation further includes synthesizing the electronic document to create a synthesized electronic document, by at least filtering one or more portions out of the electronic document, wherein the one or more portions are determined to satisfy at least one predefined rule, identifying a first set of terms corresponding to the electronic document to include in the synthesized electronic document, using a data dictionary structure, and identifying a second set of terms corresponding to the electronic document to include in the synthesized electronic document, wherein at least one word in the second set of terms satisfies at least one predefined pattern matching rule. Additionally, the operation includes accessing an index for a data repository using the synthesized electronic document to identify a first set of electronic documents within the data repository. The operation further includes identifying a second set of electronic documents by processing the electronic document as an input to a machine learning model trained to recognize relevant items within the electronic repository. The operation includes returning at least a portion of the first set of electronic documents and the second set of electronic documents to the requesting device.

In one aspect, in combination with any example above, the operation further includes retrieving metadata specifying an area of the aircraft that the electronic document relates to, and assigning a respective weight to at least one of the terms in the first set of terms and the second set of terms, based on the specified area of the aircraft that the electronic document relates to.

In one aspect, in combination with any example above, synthesizing the electronic document to create the synthesized electronic document further comprises adding one or more synonym words to the electronic document that correspond to a first word within the electronic document.

In one aspect, in combination with any example above, synthesizing the electronic document to create the synthesized electronic document further comprises replacing a first word within the electronic document with a corresponding stem word.

In one aspect, in combination with any example above, at least one word in the second set of terms is assigned a respective weight based on the corresponding at least one predefined pattern matching rule, wherein the weight is further determined based on a section of the aircraft that the electronic document relates to, wherein at least one section of the aircraft is assigned respective weights for the at least one predefined pattern matching rules.

In one aspect, in combination with any example above, identifying the second set of terms within the electronic document to include in the synthesized electronic document further comprises determining when a plurality of words, inclusive of one of the second set of terms, satisfies one or more predefined pattern matching rules.

In one aspect, in combination with any example above, synthesizing the electronic document to create the synthesized electronic document, further includes identifying a third set of terms corresponding to the electronic document to include in the synthesized electronic document, by processing the electronic document as an input to a machine learning model trained to recognize relevant terms within the electronic document.

In one aspect, in combination with any example above, the operation further includes refining the machine learning model trained to recognize relevant items within the data repository, and storing the electronic document and an associated optimum solution within the data repository, wherein the data repository includes at least a first electronic document that comprises a repair request for an aircraft system, an update to an aircraft system, a replacement of an aircraft system, or a combination thereof, and wherein the requesting device further comprises an operator device for a fleet of aircrafts, inclusive of the aircraft.

Another embodiment described herein provides a method that includes receiving, from a requesting device, an electronic document specifying natural language text describing an issue with a complex system. The method further includes removing one or more portions from the electronic document that are determined to satisfy one or more predefined filtering rules. The method also includes determining a first set of terms corresponding to the electronic document to include in the synthesized electronic document, using a data dictionary structure. The method includes determining a second set of terms corresponding to the electronic document to include in the synthesized electronic document, wherein at least one term in the second set of terms satisfies at least one predefined pattern matching rule. Additionally, the method includes determining a third set of terms corresponding to the electronic document by processing the electronic document as an input to a machine learning model trained to recognize relevant terms within the electronic document. The method includes generating a synthesized document, based on the first set of terms, the second set of terms, and the third set of terms. The method further includes determining a set of relevant electronic documents within the data repository, based on the synthesized electronic document. The method also includes returning at least a portion of the set of relevant electronic documents to the requesting device.

BRIEF DESCRIPTION OF THE DRAWINGS

So that the manner in which the above recited features of the present disclosure can be understood in detail, a more particular description of the disclosure, briefly summarized above, may be had by reference to aspects, some of which are illustrated in the appended drawings.

FIGS. 4A-D illustrate terms identified within an electronic document through various term-identification techniques, according to one embodiment of the present disclosure.

FIG. 5 is a graphical interface representing exemplary query results, according to one embodiment of the present disclosure.

FIG. 6 is a block diagram illustrating a method of identifying a set of documents with a data repository that are relevant to a received electronic document, according to one embodiment described herein.

FIG. 7 is a block diagram illustrating a method for identifying a set of electronic documents within a data repository that are relevant to a received electronic document through the use of a machine learning model.

FIG. 8 is a block diagram illustrating a method for identifying a set of electronic documents within a data repository that are relevant to a received electronic document through the use of a machine learning model configured to identify relevant terms within the received electronic document, according to one embodiment described herein.

DETAILED DESCRIPTION

Figure 1:
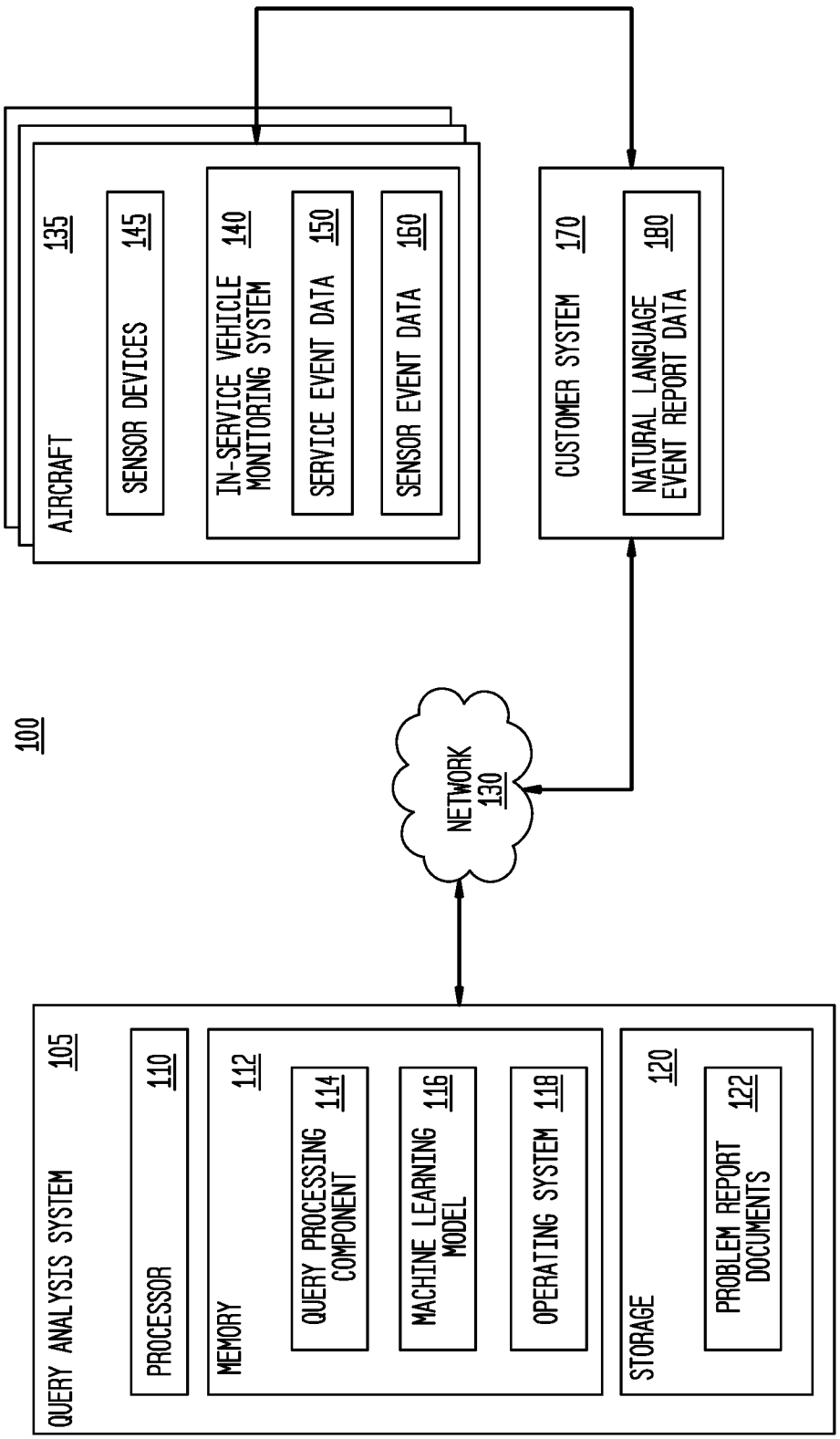
FIG. 1 is a block diagram illustrating a system that includes a query processing component, according to one embodiment of the present disclosure.

Modern manufacturers and service providers have an increasingly large set of data relating to the lifecycle of complex systems (e.g., aircrafts), including performance data collected by sensors on the aircraft, maintenance reports, maintenance solutions, service bulletins, and so on. Frequently, the solution to a given fault with a complex system can be found within the data repository maintained by the manufacturer, as in many cases the fault has been experienced previously with a similar complex system and details describing the solution to the fault are documented within the data repository. However, due to the size of the data repository and the difficulty in generating an optimal search query for finding data relating to a specific fault with a specific complex system, conventional computer-based searching solutions are insufficient to address the needs of complex system manufacturers and service providers.

For example, an aircraft manufacturer may receive several sentences of natural language text describing the fault a customer is experiencing with a particular aircraft. While a search query could be generated using the entirety of the natural language text, doing so does not distinguish which piece(s) of data within the text are relevant and/or important to the specific fault the customer is experiencing. For example, stop words (e.g., a, an, the, etc.) are common to almost all natural language text and are generally unimportant for inclusion in search queries, while information such as part numbers, aircraft locations, the specific fault being experienced and so on can be highly relevant.

Conventional technical solutions do not provide adequate ways to transform a natural language customer report for an aircraft maintenance event into a search query that will produce accurate results detailing the solution(s) to the fault the customer is experiencing. As a result, in many instances, the task of searching the data repository for the solution is a manual process, with an aircraft manufacturer or service provider employee generating a search query (or multiple search queries) and manually reviewing the query results in order to identify a potential solution for the customer. Such a process is expensive in terms of both time and resources. Moreover, the service provider employee performing the search may struggle to identify the relevant search terms within the natural language report of the issue, unless the service provider employee has a substantial understanding of the lifecycle of the aircraft and common faults and solutions faced during the lifecycle. However, it can be difficult and expensive to find employees with the proper knowledgebase and understanding to efficiently perform such searches, thereby rendering conventional solutions inefficient and hindering the scalability of such solutions.

Embodiments described herein provide techniques to solve the technical fault of automating the computer-based determination of relevant electronic documents within an electronic data repository, based on a natural language report of an issue with a complex system, in order to identify relevant solutions and other information described within electronic documents in the data repository. Advantageously, embodiments can autonomously determine a set of electronic documents within the data repository that identify similar complex system issues and their corresponding applicable solutions, based on a given natural language report of an issue with a complex system, thereby significantly reducing the lifecycle cost of the complex system (e.g., an aircraft) and helping to reduce the need of subject matter experts to manually intervene in the search process.

Generally, embodiments described herein provide autonomous data analysis methods and tools for synthesizing complex system discrepancies and metadata.

Embodiments described herein can identify similar complex system solutions by creating relationships between a new discrepancy and previous solutions. One embodiment synthesizes the complex system discrepancies into a relevant searchable data model. Such an embodiment can then search using entirety of the complex system discrepancy with identified keywords found in an auto-refining data dictionary and weighted importance data fields. Embodiments can identify similar complex system discrepancies using machine learning and data modeling techniques, and can correlate search results with machine learning identified records. Pattern analysis can further be used to provide predictive analysis. Embodiments can then generate relevant solution information using correlated discrepancies and provide this information to the customer submitting the fault report.

One embodiment provides computer-based search functionality to identify similar, previously documented aircraft issues with applicable solutions, based on a natural language report of an aircraft issue for a particular aircraft. While embodiments are described herein as relating to the maintenance and lifecycle of aircrafts, more generally the techniques described herein can be applied to the lifecycle of other products as well and are not limited only to the aircraft space. As such, the examples within the present pertaining to the maintenance and lifecycle of aircrafts are provided for illustrative purposes only and without limitation. More generally, however, embodiments can be applied to the maintenance and lifecycle of a variety of different products (e.g., other vehicles, complex systems, etc.) to increase efficiencies, reduce cost, and increase product availability. Embodiments described herein provide best fit solutions and refinement capability to increase accuracy to achieve high level usability, by synthesizing customer information with a machine learning data model that autonomously provides relevant solutions. Embodiments can thus analyze a single customer issue in real time and correlates the customer issue to all available customer information. As data increases, the data model viability improves automatically, and embodiments provide a much more scalable approach than conventional solutions, which rely on subject matter experts to directly assist in the search process.

FIG. 1 is a block diagram of a system that includes a query processing component, according to one embodiment described herein. As shown, the system 100 includes a query analysis system 105, a plurality of aircraft 135 and a customer system 170, interconnected by a data communications network 130. The query analysis system 105 includes, without limitation, one or more computer processors 110, a memory 112, and storage 120, each connected to a bus (not shown). The query analysis system 105 may also include an input/output (I/O) device interface (not shown) connecting I/O devices (e.g., keyboard, mouse, and display devices) to the query analysis system 105. Further, in context of this disclosure, the computing elements shown in the query analysis system 105 may correspond to a physical computing system (e.g., a system in a data center) or may be a virtual computing instance executing within a computing cloud.

Generally, an apparatus of example implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, processor 110, connected to memory 112 (e.g., a Random Access Memory (RAM) device, a storage device, etc.).

Generally, the computer processor(s) 110 retrieves and executes programming instructions stored in the memory 112 as well as stores and retrieves application data residing in the memory 112. The bus is used to transmit programming instructions and application data between computer processor(s) 110, I/O devices interface, storage 120, a network interface (not shown), and memory 112. Note, computer processor(s) 110 is included to be representative of a single CPU, multiple CPUs, a single CPU having multiple processing cores, and the like.

The computer processor(s) 110 generally represent any piece of computer hardware that is capable of processing information such as, for example, data, computer programs and/or other suitable electronic information. The computer processor(s) 110 are composed of a collection of electronic circuits some of which may be packaged as an integrated circuit or multiple interconnected integrated circuits (an integrated circuit at times more commonly referred to as a "chip"). The computer processor(s) 110 may be configured to execute computer programs, which may be stored onboard the processor or otherwise stored in the memory 112 (of the same or another apparatus). Memory 112 is generally included to be representative of a random access memory. Storage 120 may be a disk drive storage device. Although shown as a single unit, storage 120 may be a combination of fixed and/or removable storage devices, such as fixed disc drives, removable memory cards, or optical storage, network attached storage (NAS), or a storage area-network (SAN).

The computer processor(s) 110 may each represent a number of processors, a multi-processor core or some other type of processor, depending on the particular implementation. Further, the computer processor(s) 110 may be implemented using a number of heterogeneous processor systems in which a main processor is present with one or more secondary processors on a single chip. As another illustrative example, the computer processor(s) 110 may be a symmetric multi-processor system containing multiple processors of the same type. In yet another example, the computer processor(s) 110 may be embodied as or otherwise include one or more application-specific integrated circuits (ASICs), field-programmable gate arrays (FPGAs) or the like. Thus, although the computer processor(s) 110 may be capable of executing a computer program to perform one or more functions, the processor of various examples may be capable of performing one or more functions without the aid of a computer program.

The memory 112 generally represents any piece of computer hardware that is capable of storing information such as, for example, data, computer programs (e.g., computer-readable program code) and/or other suitable information either on a temporary basis and/or a permanent basis. The memory 112 may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk—read only memory (CD-ROM), compact disk-read/write (CD-R/W), digital versatile disk (DVD), or the like. In various instances, the memory 112 may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 112, the processor 110 may also be connected to one or more interfaces for displaying, transmitting and/or receiving information. The interfaces may include a communications interface (e.g., communications unit) and/or one or more user interfaces one example of which may be a network interface. The network interface may be configured to transmit and/or receive information, such as to and/or from another apparatus(es), network(s) or the like. The network interface may be configured to transmit and/or receive information by physical (wired) and/or wireless communications links. Examples of suitable communication interfaces include a network interface controller (NIC), wireless NIC (WNIC) or the like.

The user interfaces may include a display and/or one or more user input interfaces (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

The memory 112 contains a query processing component 114, a machine learning model 116 and an operating system 118. Generally, the operating system 118 represents software that is configured to manage computing hardware and software resources on the query analysis system 105. The operating system 118 may further provide computing services for software applications executing on the query analysis system 105.

Additionally, the query processing component 114 could communicate with the customer system 170 to retrieve the natural language event report data 180. Each aircraft 135 includes sensor devices 145 and an in-service vehicle monitoring system 140, which in turn includes service event data 150 and sensor event data 160. Generally, the service event data 150 represents diagnostic data (e.g., diagnostics codes and corresponding timestamps at which events classified with the diagnostic codes were detected) collected for the corresponding in-service vehicle. In one embodiment, events within the service event data 150 are automatically recorded by control logic within vehicles of the given class of vehicle.

The sensor event data 160 generally represents data collected from the sensor devices 145 on the respective in-service vehicle. Sensor devices 145 may include, without limitation, temperature sensors, pressure sensors, positioning sensors, altitude sensors, and so on. More generally, any sensor suitable for monitoring an attribute of an in-service vehicle can be used, consistent with the functionality described herein. In one embodiment, the query analysis system 105 provides a plurality of predefined trigger conditions, each specifying conditional logic for one or more types of sensor data collected from the one or more sensor devices. In such an embodiment, upon determining that one or more sensor data values from the one or more sensor devices satisfy one of plurality of predefined trigger conditions, the query analysis system 105 records a sensor event within the sensor event data 160.

The customer system 170 generally represents a computer system through which maintenance event reports can be submitted (e.g., by engineers) and includes natural language event report data 180. Generally, the natural language event report data 180 includes a natural language description of each of a plurality of service events. For example, an engineer could enter (e.g., using a graphical user interface generated by the customer system 170) a textual description of a particular service event, including, for example, the fault experienced, the cause of the fault, the fault(s) of the service event and the resolution of the fault.

Generally, the query processing component 114 can receive, from a requesting device, an electronic document specifying natural language text describing a customer issue with an aircraft. For instance, the query processing component 114 could receive the natural language event report data 180 from the customer system 170. As an example, the electronic document could specify the aircraft in question, the area within the aircraft experiencing the discrepancy, the part numbers of any part numbers involved, sensor readings relating to the discrepancy, as well as a natural language description of the discrepancy. An example of such an electronic document is shown in FIG. 4A and discussed in more detail below. More generally, however, the electronic document can include any natural language description of a discrepancy or issue being experienced with any complex system (e.g., an aircraft, another vehicle, etc.), consistent with the present disclosure.

The query processing component 114 can synthesize the electronic document to create a synthesized electronic document for use in identifying relevant documents within a data repository. For example, the query processing component 114 can filter one or more stop words out of the electronic document. Generally, stop words represent common words that are found in nearly every document, with examples of English stop words including, without limitation, "a", "an", "the", "of" and so on. More generally, any words that commonly do not add any semantic meaning to the electronic document can be filtered out, consistent with embodiments described herein.

Additionally, the identifying a first set of terms corresponding to the electronic document to include in the synthesized electronic document, using a data dictionary structure. For example, the data dictionary structure can specify a listing of words that are determined to be relevant terms, and the data dictionary structure may further specify a weight associated with each of the words that indicates a likelihood that the corresponding word is indicative of the discrepancy or fault represented by the electronic document. For example, a particular document may include several paragraphs of natural language text describing a discrepancy, but a particular phrase specifying that a specific part number has a visible crack could be especially meaningful as to the fault represented by the electronic document and the solution to the represented fault.

Moreover, the query processing component 114 could identify a second set of terms corresponding to the electronic document to include in the synthesized electronic document, wherein at least one term in the second set of terms corresponding to satisfies at least one predefined pattern matching rule. For example, a pattern matching rule could be defined to recognize a format of part numbers used by a particular aircraft part supplier. More generally, however, any type of pattern can be used, consistent with the functionality described herein.

The query processing component 114 could then access an index for a data repository using the synthesized electronic document to identify a first set of relevant electronic documents within the data repository. For example, each document within the data repository could be indexed based on an evaluation of the contents of the respective document in view of the data dictionary structure as well as the predefined pattern matching rules. As such, the query processing component 114 can effectively search the data repository not by directly using the contents of the electronic document, but rather by comparing the results of the analysis of the electronic document with the index structure generated by performing a similar analysis on the electronic documents stored within the data repository, to identify other documents within the data repository having similar analysis results.

In one embodiment, the query processing component 114 can further identify a second set of relevant electronic documents by processing the electronic document as an input to the machine learning model 116. For example, the machine learning model 116 could be trained to recognize relevant items within the electronic repository. The query processing component 114 could then return at least a portion of the first set of relevant electronic documents and the second set of relevant electronic documents to the requesting device.

In one embodiment, the query processing component 114 can retrieve metadata specifying an area of the aircraft that the electronic document relates to. For example, when submitting the natural language event report data 180, the user of the customer system 170 can specify an area of the aircraft in question that experienced the event (e.g., the wing of the aircraft, the landing system, the cockpit, etc.). In one embodiment, the electronic document can specify data such as an Air Transport Association of America (ATA) Code (e.g., a Chapter and Subchapter), a model number, and so on that can be used to determine an area of interest within the aircraft that the electronic document relates to.

The query processing component 114 can assign a respective weight to at least one of the terms in the first set of terms and the second set of terms, based on the specified area of the aircraft that the electronic document relates to. In other words, the query processing component 114 can determine that particular terms are particularly indicative of certain events when used in event reports for a particular area of the aircraft, but the same terms may be poor indicators of specific events occurring when used in event reports relating to other areas of the aircraft. As such, the query processing component 114 can assign different weights to the terms depending on the area of the aircraft corresponding to the natural language event report data 180.

Additionally, when determining the set of terms for the document, the query processing component 114 can insert synonyms for words appearing within the document into the set of terms. For example, many customers may use the term "LH" as shorthand for "left hand" when writing electronic documents detailing event occurrences for an aircraft, and the query processing component 114 could insert the phrase "left hand" into the terms to be considered upon detecting that the acronym "LH" appears within the electronic document. Similarly, the query processing component 114 can generate a term that represents a stem word for a word appearing within the electronic document for inclusion within the set of terms. As an example, while the electronic document could include the word "replacement", the query processing component 114 could include the term "replace" in the set of terms used to determine relevant documents within the data repository, as "replace" is the stem of the word "replacement."

Additionally, the query processing component 114 can utilize pattern matching to identify when a plurality of words satisfy one or more predefined matching rules. For example, a matching rule could be defined to identify any phrase of the words "part no." (or any synonyms or variations thereof) followed by an alphanumerical value. Continuing the example, upon determining that the document includes the phrase "Part No. 12345", the query processing component 114 could include the term "Part No. 12345" in the set of terms used to determine relevant documents within the electronic data repository.

In a particular embodiment, the query processing component 114 can process the electronic document using a machine learning model (e.g., machine learning model 116) to determine a set of relevant terms corresponding to the document. For example, a machine learning model could be trained to analyze the electronic document detailing the aircraft fault and the machine learning model could output one or more terms that are determined to be relevant to the fault or event represented by the electronic document. The query processing component 114 could then use the terms identified by the machine learning model to query the data repository to identify relevant previous fault reports and solutions that relate to the electronic document.

Figure 2:
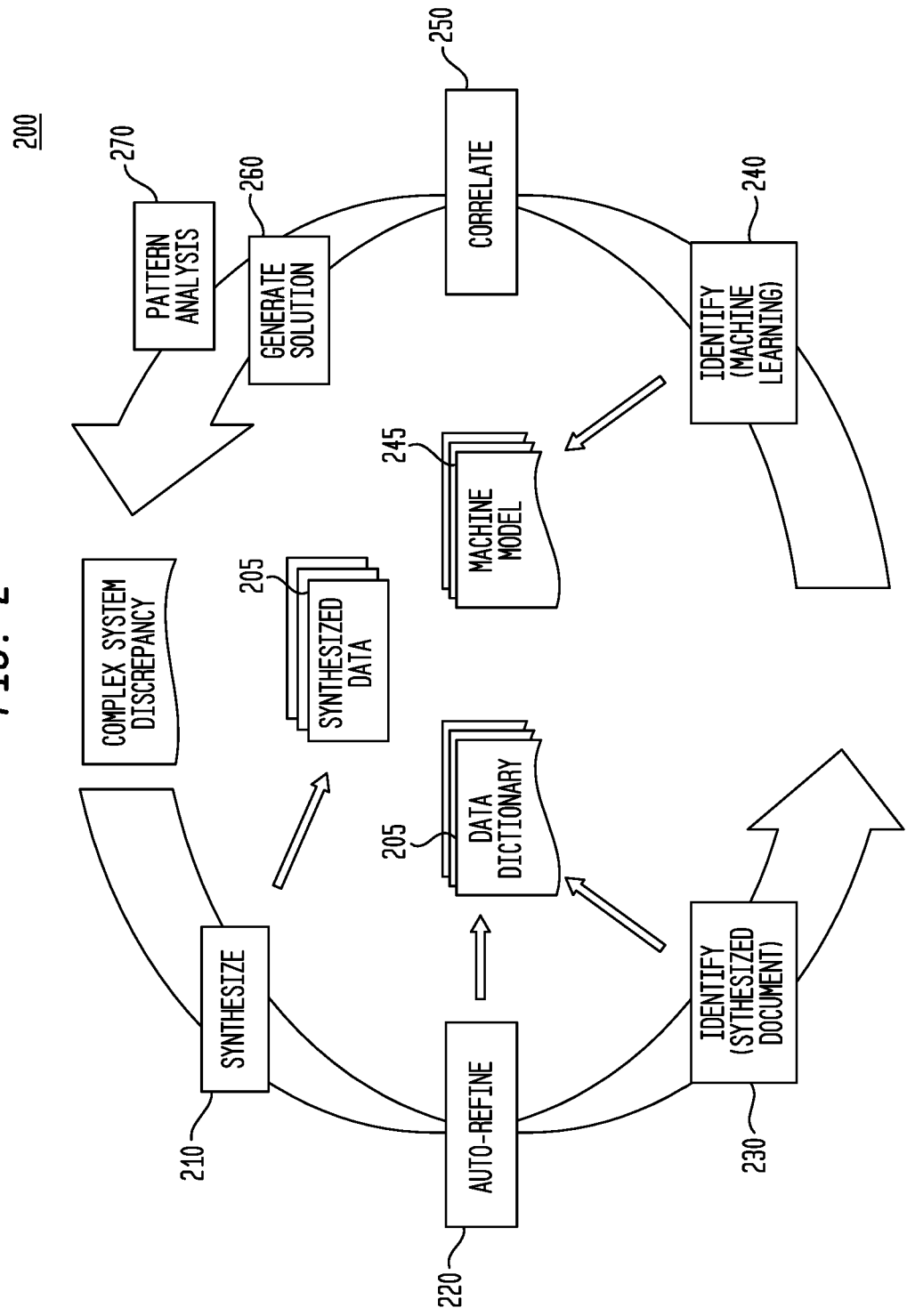
FIG. 2 illustrates a workflow for processing an electronic document to identify potential solutions to a fault represented by the electronic document, according to one embodiment of the present disclosure.

FIG. 2 illustrates a workflow for processing an electronic document to identify potential solutions to a fault represented by the electronic document, according to one embodiment of the present disclosure. As shown, the workflow 200 depicts a complex discrepancy system, and the workflow begins when the query processing component 114 receives an electronic document containing a natural language description of a complex system (e.g., an aircraft) discrepancy to be processed against a data repository containing searchable data 205.

The workflow 200 begins with the query processing component 114 synthesizing the received electronic document to generate a set of terms. In doing so, the query processing component 114 could remove any stop words within the electronic document or other portions of the electronic document determined to have little to no bearing on the semantic meaning of the electronic document. In one embodiment, the query processing component 114 further generates a corresponding set of weights, with each weight corresponding to one of the terms in the set of terms. Generally, the query processing component 114 can perform an auto-refinement operation on the electronic document to further refine the set of terms corresponding to the document through the use of the data dictionary 215. Generally, the data dictionary 215 can specify a set of terms that are commonly indicative of the discrepancy represented by the electronic document containing the terms. If the query processing component 114 identifies any of the terms within the data dictionary 215 within the electronic document, the query processing component 114 can include those terms (and any corresponding weights) in determining relevant documents within the data repository.

The query processing component 114 can then initiate the search (block 230) of the data repository to identify similar discrepancy reports and their corresponding solutions. Additionally, the query processing component 114 can analyze the electronic document (or terms derived from the electronic document) using a trained machine learning model 245, in order to identify (block 240) one or more similar discrepancy reports (and their corresponding solutions). The query processing component 114 can correlate (block 250) the similar discrepancy reports and solutions with one another in order to determine a ranked set of query results. The query processing component 114 can generate a solution (block 260) to the electronic document detailing the discrepancy report from the correlated reports. Additionally, the query processing component 114 can perform a pattern analysis 270 to determine whether the electronic document satisfies any pre-defined patterns for discrepancy reports and, if so, can alter the generated solution accordingly.

As shown in block 260, the query processing component 114 can generate a solution to the issue described by the electronic document. In one embodiment, the returned solution can include a ranked listing of two or more potential solutions. The query processing component 114 can determine the potential solutions based on the set of solutions corresponding to the identified set of relevant electronic documents within the data repository. For example, the query processing component 114 could determine a measure of relevancy for each of the electronic documents within the data repository, where the measure of relevancy reflects the determined relevancy between the received electronic document (i.e., the document containing the natural language description of a current issue) and the respective electronic document within the data repository (e.g., specifying a natural language description of a historical issue). In one embodiment, the query processing component 114 is configured to identify a first set of relevant electronic documents using the synthesized electronic document (at block 230) and a second set of relevant electronic documents using a machine learning model (at block 240). The query processing component 114 can then correlate the first and second sets of relevant electronic documents to generate an aggregate set of relevant documents. In doing so, the query processing component 114 can adjust the measures of relevancy from the first and second sets of relevant electronic documents as part of the correlation operation. For example, if the query processing component 114 determines that a particular electronic document was identified in both the first and second sets of relevant electronic documents, the query processing component 114 could increase the measure of relevancy for the particular electronic document (e.g., by combining the measure of relevancy for the particular document in the first set with the measure of relevancy for the particular document in the second set).

The query processing component 114 could then cluster the set of solutions (e.g., a natural language description of how the historical issue was addressed) to generate two or more solution groups. The query processing component 114 could then determine the two or more potential solutions corresponding to the generated solution groups. The query processing component 114 could then determine a measure of relevancy for each of the generated solution groups, based on the measures of relevancy for the various electronic documents assigned to each group. The query processing component 114 could then rank the potential solutions, based on the measures of relevancy for the various electronic documents assigned to each group.

For example, the query processing component 114 could determine that 20 electronic documents within the data repository are sufficiently relevant to the received electronic document. The query processing component 114 could then determine that the 20 electronic documents correspond to two different solutions (i.e., the issues described in the 20 electronic documents were solved using one of two different solutions). The query processing component 114 could further determine a ranking of the two different solutions, based on the measures of relevancy for the electronic documents corresponding to the solutions. For example, if the 10 most relevant documents describe issues that were solved using a first solution, and the remaining documents in the set of identified documents were solved using a second solution, the query processing component 114 could rank the first solution ahead of the second solution in returning the solutions to the requesting entity. As another example, the query processing component 114 can consider the frequency of use of the various solutions in determining the ranking. For example, of 18 of the 20 electronic documents describe issues that were solved using a third solution, and the remaining 2 electronic documents were solved using a fourth solution, the query processing component 114 could prioritize the third solution over the fourth solution in the ranking, as the third solution was used a significant number of times more than the fourth solution. Of course, such an example is provided without limitation and for illustrative purposes only, and more generally the query processing component 114 can rank the solutions using any suitable method, consistent with the functionality described herein.

The query processing component 114 can then provide the solution(s) to the requesting entity from which the electronic document was received (e.g., the owner and/or operator of the complex system in question). For example, the query processing component 114 could correlate the results of accessing the data repository and can generate an electronic report detailing the identified solution(s) to the issue or situation described by the electronic document. Such a solution(s) can then be reviewed and implemented by users (e.g., engineers that service the complex system in question) to address the issue or situation raised in the electronic document that was processed by the query processing component 114. Advantageously, embodiments provide a technical solution to the technical fault of automatically identifying relevant natural language text data within a data repository, e.g., by processing a received electronic document containing natural language text and to generate a synthesized electronic document for use in accessing an index structure for the data repository.

Figure 3:
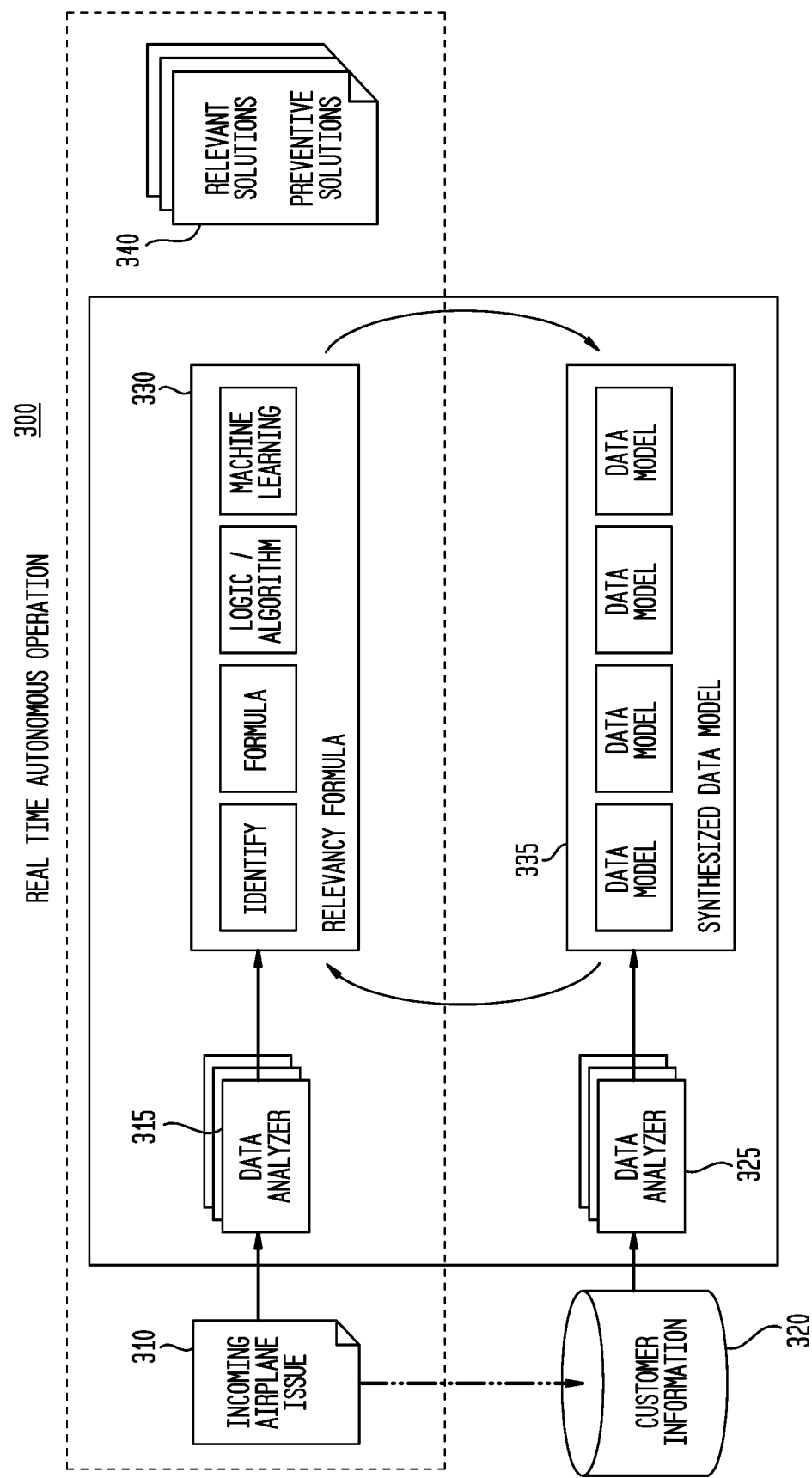
FIG. 3 illustrates a workflow for a two-tiered approach to processing an electronic document to identify potential solutions to a fault represented by the electronic document, according to one embodiment of the present disclosure.

FIG. 3 illustrates a workflow for a two-tiered approach to processing an electronic document to identify potential solutions to a fault represented by the electronic document, according to one embodiment of the present disclosure. As shown, the workflow 300 begins at block 310, where the query processing component 114 receives an electronic document detailing an incoming airplane issue using natural language text. The query processing component 114 then analyzes the electronic document using a two-tiered approach. For example, the query processing component 114 could retrieve customer information 320 specific to the electronic document (e.g., faults and discrepancies previously experienced by the customer, terminology and acronyms commonly used in electronic documents written by the customer, etc.), and the data analyzer component 325 extracts relevant terms and other metadata from the electronic document, for input into the data models 335. Generally, the data models 335 are configured to identify documents (and corresponding solutions) within a data repository that correspond to the received inputs (e.g., the extracted terms and other metadata).

Additionally, the query processing component 114 analyzes the electronic document using the data analyzer 315, which uses multiple techniques to extract key terms from the electronic document, for use in identifying similar customer-reported faults and their corresponding solutions. In doing so, the query processing component 114 can utilize a combination of search techniques, pattern matching formulas, computer logic and algorithms and machine learning techniques to identify relevant customer-reported faults and their corresponding solutions, based on the results of the analysis of the incoming electronic document performed by the data analyzer 315. The results of the analysis by the data models 335 and the analysis 330 can then be compiled to provide relevant solutions as well as preventative solutions 340 to the client.

FIGS. 4A-D illustrate terms identified within an electronic document through various term-identification techniques, according to one embodiment of the present disclosure. As shown, FIG. 4A illustrates a document 400 where a number of stop words and inconsequential phrases have been removed by a preprocessing operation. For example, the words "of", "the", "that" " " and so on have all been removed from the document, as these stop words are commonly used across the majority of documents and provide little semantic meaning to the document in question. Additionally, the phrase "shown in view/A/and B/" has been removed. In the present example, assume that a regular expression was created to remove this (and similar) phrases, as these phrases alone add little to the semantic meaning of the document (e.g., the phrase merely refers to the attached images, and adds no value in and of itself). Moreover, as shown, the query processing component 114 has added additional terms corresponding to synonyms and stem words of the identified terms to a synthesized document used to identify relevant electronic documents within a data repository. In the depicted example, the terms "Left Hand" have been added, responsive to the query processing component 114 determining that the acronym "LH" is a predefined acronym corresponding to the terms "Left Hand." Moreover, the query processing component 114 has added the term "Finish" to the synthesized document, based on the usage of the word "Finishing" within the document and based a determination that "Finish" is the stem word of "Finishing."

FIG. 4B illustrates a document 420 where the query processing component 114 has analyzed the incoming document and has identified a set of terms (or keywords) within the document using a data dictionary. The identified terms are shown in bold, where terms such as "LEFT CAR DOOR TRIM" and "PLATING PROCESS" have been identified as potentially important terms within the document, based on the presence of these terms within the data dictionary. Generally, the data dictionary can be constructed to include terms that are commonly indicative of the maintenance fault or discrepancy corresponding to the electronic document containing the terms.

FIG. 4C illustrates a document 440 where the query processing component 114 has analyzed the document using a trained machine learning model and has identified particular terms as relevant (shown in underlined text). Thus, in the depicted example, the machine learning model determined that terms such as "finish treatment" and "plating process" are relevant, while other terms such as "recorded lead time" are not. Furthermore, FIG. 4D illustrates the results of a pattern matching analysis on the received electronic document, with the identified terms appearing in bold and underlined font. For example, in the depicted embodiment, the query processing component 114 has determined that the part numbers "P/N XXXX1234" and "P/N XXXX2345" satisfy predefined pattern matching results for identifying part numbers following a particular naming convention and appearing within electronic documents. As such, the query processing component 114 can include the highlighted terms when generating a synthesized document for use in formulating a query for the data repository.

Once the terms are identified, the query processing component 114 can initiate an operation (or multiple operations) for determining relevant electronic documents within the data repository and can determine a set of relevant fault reports and their corresponding solutions. For example, the query processing component 114 could perform several different operations using the various sets of terms identified within the electronic documents (e.g., the highlighted terms shown in FIGS. 4A-D) and could perform a correlation operation (block 250) to reconcile the various results into a single aggregated set of results. Such a set of aggregated results could then be displayed in a graphical user interface, as shown in FIG. 5, which depicts a graphical interface representing exemplary query results, according to one embodiment of the present disclosure. As shown, the graphical user interface 500 depicts various submission identifiers that uniquely identify the previous discrepancy reports that were found to be relevant to the present electronic document, as well as natural language descriptions of the relevant historical reports. The graphical user interface 500 could be configured so that when a user selects one of the relevant historical reports, additional description of the selected report is displayed, as well as any solution data pertaining to the selected report (e.g., a natural language write-up of how the fault detailed in the historical report was addressed, as well as any part numbers or service bulletins relating to the fault).

FIG. 6 is a block diagram illustrating a method of identifying a set of documents with a data repository that are relevant to a received electronic document, according to one embodiment described herein. As shown, the method 600 begins at block 610, where the query processing component 114 receives, from a requesting device, an electronic document specifying natural language text describing an issue with a complex system. The query processing component 114 then synthesizes the electronic document to create a synthesized electronic document, by removing one or more portions of the electronic document that are determined to satisfy one or more predefined filtering rules, identifying a first set of terms corresponding to the electronic document to include in the synthesized electronic document, using a data dictionary structure, and identifying a second set of terms corresponding to the electronic document to include in the synthesized electronic document, wherein each term in the second set of terms corresponding to satisfies at least one predefined pattern matching rule (block 620). The query processing component 114 further identifies a first set of electronic documents within the data repository relating to the synthesized electronic document (block 630). Additionally, the query processing component 114 returns at least a portion of the first set of electronic documents to the requesting device (block 640), and the method 600 ends.

FIG. 7 is a block diagram illustrating a method for identifying a set of electronic documents within a data repository that are relevant to a received electronic document through the use of a machine learning model. The method 700 begins at block 710, where the query processing component 114 receives, from a requesting device, an electronic document specifying natural language text describing a customer issue with an aircraft. The query processing component 114 synthesizes the electronic document to create a synthesized electronic document, comprising: filtering one or more portions out of the electronic document, wherein the one or more portions are determined to satisfy at least one predefined rule, identifying a first set of terms corresponding to the electronic document to include in the synthesized electronic document, using a data dictionary structure, and identifying a second set of terms corresponding to the electronic document to include in the synthesized electronic document, wherein each word in the second set of terms satisfies at least one predefined pattern matching rule (block 720). Additionally, the query processing component 114 accesses an index for a data repository using the synthesized electronic document to identify a first set of electronic documents within the data repository (block 730). The query processing component 114 further identifying a second set of electronic documents by processing the electronic document as an input to a machine learning model trained to recognize relevant items within the electronic repository (block 740). At block 750, the query processing component 114 returns at least a portion of the first set of electronic documents and the second set of electronic documents to the requesting device, and the method 700 ends.

FIG. 8 is a block diagram illustrating a method for identifying a set of electronic documents within a data repository that are relevant to a received electronic document through the use of a machine learning model configured to identify relevant terms within the received electronic document, according to one embodiment described herein. As shown, the method 800 begins at block 810, where the query processing component 114 receives, from a requesting device, an electronic document specifying natural language text describing an issue with a complex system. The query processing component 114 removes one or more portions from the electronic document that are determined to satisfy one or more predefined filtering rules (block 820). For example, the query processing component 114 could filter one or more stop words out of the electronic document. The query processing component 114 also determines a first set of terms corresponding to the electronic document to include in the synthesized electronic document, using a data dictionary structure (block 830).

Additionally, the query processing component 114 determines a second set of terms corresponding to the electronic document to include in the synthesized electronic document, wherein each term in the second set of terms satisfies at least one predefined pattern matching rule (block 840). The query processing component 114 determines a third set of terms corresponding to the electronic document by processing the electronic document as an input to a machine learning model trained to recognize relevant terms within the electronic document (block 850).

The query processing component 114 then generates a synthesized electronic document, based on the first set of terms, the second set of terms, and the third set of terms (block 860). The query processing component 114 uses the synthesized electronic document to determine a set of relevant electronic documents within the data repository (block 870). The query processing component 114 returns at least a portion of the set of relevant electronic documents to the requesting device (block 880), and the method 800 ends.

With use of the at least a portion of the set of relevant electronic documents, a fault is addressed in a complex system. A technician for the complex system uses the at least a portion of the set of relevant electronic documents to determine how to address the fault. The technician then addresses the fault, for instance by inspecting, repairing or replacing the cause of the fault. In another instance, a robot, autonomous device or computer program product is provided the at least a portion of the set of relevant electronic documents. The robot, autonomous device or computer program product then uses this information to address the fault, for instance by inspecting, repairing or replacing the cause of the fault.

With regards to an aircraft, a technician for an aircraft uses the at least a portion of the set of relevant electronic documents to determine how to address the fault. The technician then addresses the fault, for instance by inspecting, repairing or replacing the cause of the fault. In another instance, a robot, autonomous device or computer program product is provided the at least a portion of the set of relevant electronic documents. The robot, autonomous device or computer program product then uses this information to address the fault, for instance by inspecting, repairing or replacing the cause of the fault.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM), an electronically erasable programmable memory (EEPROM) such as a flash memory, an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, 3Radio Frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a DVD, a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer-implemented method, comprising:
   receiving, from a requesting device, a first electronic document specifying natural language text;
   synthesizing the first electronic document to create a second electronic document, the synthesizing comprising:
   identifying one or more portions of the first electronic document for filtering, and upon determining that the one or more portions match one or more filtering rules, generating the second electronic document by deleting the one or more portions;
   performing an auto-refinement operation on the first electronic document, comprising identifying a first set of terms corresponding to the first electronic document, and including the first set of terms in the second electronic document using a data dictionary structure; and
   identifying a second set of terms corresponding to the first electronic document, and including the second set of terms in the second electronic document by determining that terms in the second set of terms match a pattern matching rule;
   identifying a first set of electronic documents by searching within a data repository using the second electronic document comprising the first set of terms identified using the data dictionary structure;
   inputting the first electronic document to a first machine learning model trained to identify documents in one or more data repositories, and in response to identifying a second set of electronic documents in the data repository using the first machine learning model;
   correlating the first set of electronic documents and the second set of electronic documents to generate an aggregated set of electronic documents; and
   returning at least one document from the aggregated set of electronic documents to the requesting device.

2. The method of claim 1, further comprising:
   assigning a respective weight to at least one term in the first set of terms, the weight indicating a relevancy of the at least one term relative to other terms in the first set of terms,
   wherein identifying the first set of electronic documents by searching within the data repository is based on the weight assigned to the at least one term in the first set of terms.

3. The method of claim 2, wherein the natural language text relates to an aircraft, and wherein the method further comprises:
   identifying metadata specifying an area of interest in the aircraft that the first electronic document relates to,
   wherein the assigned is determined based on the area of interest.

4. The method of claim 1, wherein identifying the first set of electronic documents by searching within the data repository using the second electronic document further comprises:
   accessing an index for the data repository using the second electronic document to identify the first set of electronic documents, wherein the index is generated based on a plurality of synthesized electronic documents corresponding to a plurality of electronic documents stored within the data repository.

5. The method of claim 1, wherein synthesizing the first electronic document to create the second electronic document further comprises:
   adding one or more synonym words to the second electronic document that correspond to a first word within the first electronic document; and
   replacing a first word within the first electronic document with a corresponding stem word in the second electronic document.

6. The method of claim 1, further comprising:
   storing the first electronic document and an associated identified solution to a problem described in the natural language text, based on the at least one document from the aggregated set of electronic documents retuning to the requesting device, within the data repository; and
   updating an index for the data repository to identify the stored first electronic document and the associated identified solution.

7. The method of claim 1, wherein the natural language text relates to an aircraft, wherein at least one word in the second set of terms is assigned a respective weight based on determining that the word matches at least one pattern matching rule, wherein the weight is further determined based on a section of the aircraft that the first electronic document relates to.

8. The method of claim 1, wherein synthesizing the first electronic document to create the second electronic document, further comprises:
   identifying a third set of terms corresponding to the first electronic document to include in the second electronic document, by processing the first electronic document as an input to a second machine learning model trained to identify relevant terms within electronic documents specifying natural language text.

9. The method of claim 1, wherein returning the selected at least one document to the requesting device further comprises:
determining a relevancy metric for at least one electronic document in the first set of electronic documents, indicating a measure of relevancy of the at least one electronic document to the received first electronic document;
determining one or more solutions relating to a problem described by the natural language text of the received first electronic document, based on solutions corresponding to the electronic documents in the first set of electronic documents and the determined relevancy metric for the at least one electronic document; and
returning the one or more solutions to the problem to the requesting device.

10. The method of claim 1, wherein the natural language text relates to an aircraft, and wherein the data repository includes at least one electronic document that comprises a repair request for an aircraft system, an update to an aircraft system, a replacement of an aircraft system, or a combination of at least two of the repair request for an aircraft system, the update to an aircraft system, or the replacement of an aircraft system, and wherein the requesting device further comprises an operator device for a fleet of aircrafts, inclusive of the aircraft.

11. The method of claim 1, wherein the synthesizing further comprises:
identifying a third set of terms corresponding to the first electronic document, and including the third set of terms in the second electronic document, by analyzing the first electronic document using a second trained machine learning model.

12. The method of claim 1, wherein the synthesizing further comprises:
identifying a third set of terms corresponding to the first electronic document, and including the third set of terms in the second electronic document, based on one or more terms previously identified as relating to a requesting entity associated with the requesting device.

13. A system, comprising:
one or more computer processors; and
a memory containing computer program code that, when executed by operation of the one or more computer processors, performs an operation comprising:
receiving, from a requesting device, a first electronic document specifying natural language text;
synthesizing the first electronic document to create a second electronic document, the synthesizing comprising:
identifying one or more portions of the first electronic document for filtering, and upon determining that the one or more portions match one or more filtering rules, generating the second electronic document by deleting the one or more portions;
performing an auto-refinement operation on the first electronic document, comprising identifying a first set of terms corresponding to the first electronic document, and including the first set of terms in the second electronic document using a data dictionary structure; and
identifying a second set of terms corresponding to the first electronic document, and including the second set of terms in the second electronic document by determining that terms in the second set of terms match a pattern matching rule;
identifying a first set of electronic documents by searching within a data repository using the second electronic document comprising the first set of terms identified using the data dictionary structure;
inputting the first electronic document to a first machine learning model trained to identify documents in one or more data repositories, and in response to identifying a second set of electronic documents in the data repository using the first machine learning model;
correlating the first set of electronic documents and the second set of electronic documents to generate an aggregated set of electronic documents; and
returning at least one document from the aggregated set of electronic documents to the requesting device.

14. The system of claim 13, the operation further comprising:
retrieving metadata specifying an area of an aircraft that the first electronic document relates to, and
assigning a respective weight to at least one term in the first set of terms, based on the area of the aircraft that the first electronic document relates to.

15. The system of claim 13, wherein synthesizing the first electronic document to create the second electronic document further comprises adding one or more synonym words to the second electronic document that correspond to a first word within the first electronic document.

16. The system of claim 13, wherein at least one word in the second set of terms is assigned a weight based on determining that the word matches at least one pattern matching rule, and wherein the weight is further determined based on a section of an aircraft that the first electronic document relates to.

17. The system of claim 13, wherein identifying the second set of terms corresponding to the first electronic document, and including the second set of terms in the second electronic document further comprises determining when a plurality of words, inclusive of one of the second set of terms, matches one or more pattern matching rules.

18. The system of claim 13, wherein synthesizing the first electronic document to create the second electronic document, further comprises:
identifying a third set of terms corresponding to the first electronic document to include in the second electronic document, by processing the first electronic document as input to a second machine learning model trained to recognize relevant terms within electronic documents specifying natural language text describing problems with aircraft.

19. The system of claim 13, the operation further comprising:
storing the first electronic document and an associated identified solution to a problem described in the natural language text within the data repository.

20. A non-transitory computer program product, the computer program product comprising:
a non-transitory computer-readable storage medium having computer-readable program code embodied therewith, the computer-readable program code executable by one or more computer processors to perform an operation, the operation comprising:
receiving, from a requesting device, a first electronic document specifying natural language text;

synthesizing the first electronic document to create a second electronic document, the synthesizing comprising:
  identifying one or more portions of the first electronic document for filtering, and upon determining that the one or more portions match one or more filtering rules, generating the second electronic document by deleting the one or more portions;
  performing an auto-refinement operation on the first electronic document, comprising identifying a first set of terms corresponding to the first electronic document, and including the first set of terms in the second electronic document using a data dictionary structure; and
  identifying a second set of terms corresponding to the first electronic document, and including the second set of terms in the second electronic document by determining that terms in the second set of terms match a pattern matching rule;
identifying a first set of electronic documents by searching within a data repository using the second electronic document comprising the first set of terms identified using the data dictionary structure;
inputting the first electronic document to a first machine learning model trained to identify documents in one or more data repositories, and in response to identifying a second set of electronic documents in the data repository using the first machine learning model;
correlating the first set of electronic documents and the second set of electronic documents to generate an aggregated set of electronic documents; and
returning at least one document from the aggregated set of electronic documents to the requesting device.

* * * * *